J. B. CARLIN.
Grain Mill.
No. 232,239. Patented Sept. 14, 1880.
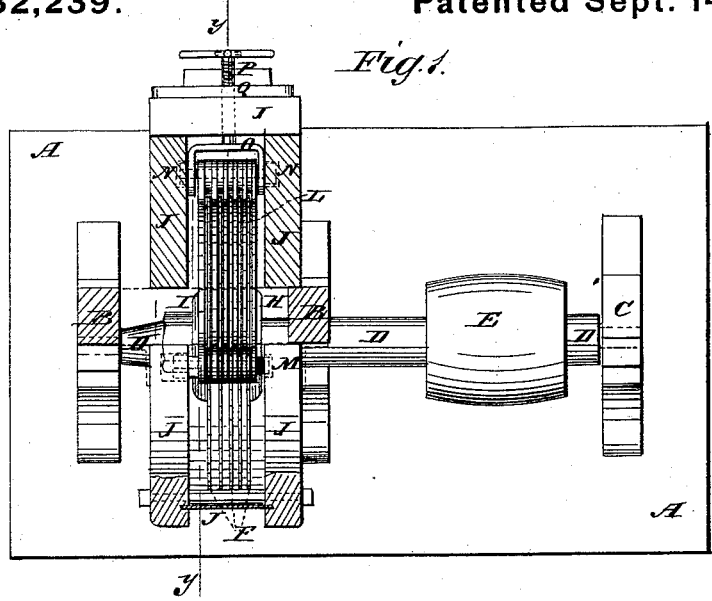
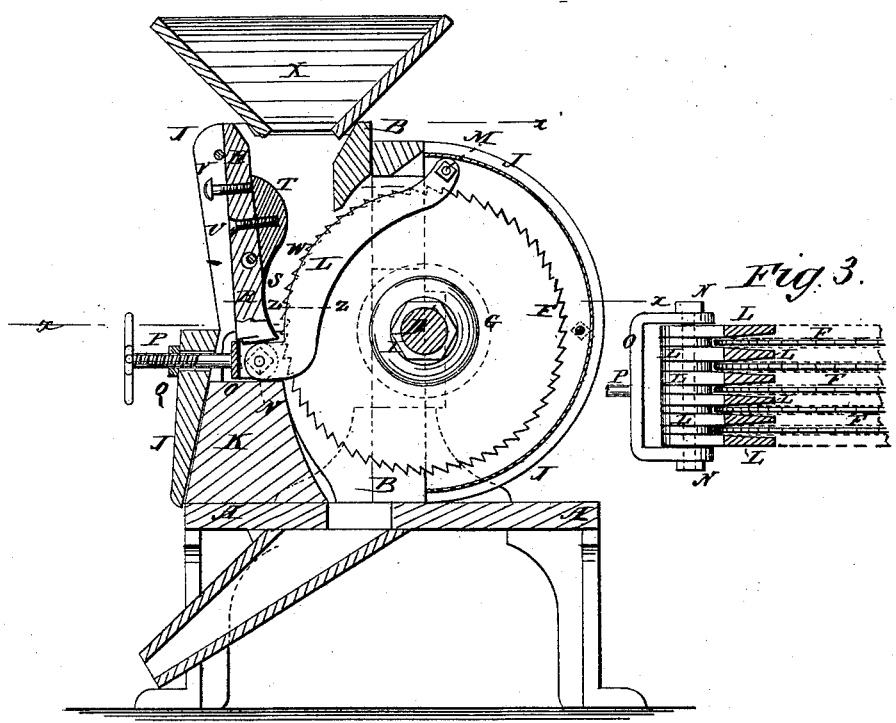
WITNESSES:
Francis McArdle.
C. Sedgwick
INVENTOR:
J. B. Carlin
BY Munn & Co
ATTORNEYS.

UNITED STATES PATENT OFFICE.

JAMES B. CARLIN, OF CARTHAGE, MISSOURI.

GRAIN-MILL.

SPECIFICATION forming part of Letters Patent No. 232,239, dated September 14, 1880.

Application filed December 29, 1879.

*To all whom it may concern:*

Be it known that I, JAMES BELL CARLIN, of Carthage, in the county of Jasper and State of Missouri, have invented a new and useful Improvement in Grain-Mills, of which the following is a specification.

Figure 1 is a sectional plan view of the improvement, taken through the line *x x x*, Fig. 2. Fig. 2 is a sectional side elevation taken through the line *y y*, Fig. 1. Fig. 3 is a sectional view taken through the line *z z*, Fig. 2.

Similar letters of reference indicate corresponding parts.

The object of this invention is to furnish mills for grinding corn, oats, and other grains for feed for stock and for other purposes where a coarse meal is required.

A represents the bench, table, or platform of the mill. To the platform A are attached an upright frame, B, and a bracket or standard, C, to which are attached bearings for the horizontal shaft D.

To the shaft D is attached a pulley, E, to receive the driving-belt. To the shaft D is also attached a set of five or more circular saws, F, which are kept at the proper distance apart by washers G, placed upon the shaft D, between the said saws F, and which are clamped together and against a shoulder or collar, H, formed upon or attached to the shaft D by a nut, I, screwed upon the said shaft D.

The saws F are inclosed with a casing, J, which is extended in front, and in the lower part of the said extended casing J is secured a block, K, for the lower ends of the bars L to rest upon.

The bars L have their middle parts curved upon the arc of the saws F, are placed between the upper forward parts of the said saws, and are tapered or thinned toward their rear edges, so that any particles of the grain that may work in between them and the saws F may readily fall through. The upper ends of the bars L are curved upward, project above the saws F, and have holes formed through them to receive the bolt M. The ends of the bars L are kept at the proper distance apart by washers placed between them, and are clamped together by nuts screwed upon the bolt M. The ends of the bolt M project to enter holes or sockets in the casing J, and thus pivot the upper ends of the bars L to the said casing J. The lower ends of the bars L, at a point a little below the level of the centers of the saws F, are bent forward, project beyond the saws F, and have holes formed through them to receive the bolt N. The lower ends of the bars L are kept at the proper distance apart upon the bolt N by washers, and are clamped together by nuts screwed upon the said bolt.

Upon the ends of the bolt N are placed the ends of a bail, O, to the center of which is swiveled the end of a hand-screw, P. The screw P passes in through a nut, Q, attached to the front of the casing J, so that it can be readily turned to adjust the convex edges of the bars L closer to or farther from the teeth of the saws F, according as it is desired to make finer or coarser meal.

To and between the forward parts of the sides of the casing J is pivoted an upright bar, R. The lower part of the inner side of the bar R has a concavity, S, formed in it, and its middle part has a convexity, T, formed upon it, as shown in Fig. 2, to form a throat, W, of such a shape as will conduct the grain to and hold it against the teeth of the saws F while being operated upon, so that the saws will act upon the grain through a longer space than would otherwise be possible.

The convexed projection or throat-block T may be made separate from the bar R, and secured to it by a screw, U, so that by loosening the screw U, and turning forward the set-screw V, which passes through the bar R and rests against the upper part of the said projection T, the upper part of the projection will be pushed inward, so that the size and form of the throat W may be regulated as the kind of grain being operated upon may require.

The grain enters the throat W from a hopper, X, placed upon the top of the casing J, as shown in Fig. 2.

Having thus described my invention, I claim as new and desire to secure by Letters Patent—

The combination of the parallel circular saws F, separated by washers G and inclosed by casing J, with the block K, the concave bars L, tapered toward the rear and projecting above the saws, and the vertical bar R, having concavity S and convexity T, as and for the purpose specified.

JAMES BELL CARLIN.

Witnesses:
M. E. CARLIN,
M. A. STEVENS.